United States Patent
Li

(10) Patent No.: US 8,467,751 B2
(45) Date of Patent: Jun. 18, 2013

(54) SERIAL INTERFACE COMMUNICATION TEST APPARATUS AND TEST METHOD USING THE SAME

(75) Inventor: Tao-Liang Li, Shenzhen (CN)

(73) Assignees: Shenzhen Futaihong Precision Industry Co., Ltd., Shenzhen (CN); Chi Mei Communications Systems, Inc., New Taipei (TW)

( * ) Notice: Subject to any disclaimer, the term of this patent is extended or adjusted under 35 U.S.C. 154(b) by 900 days.

(21) Appl. No.: 12/578,970

(22) Filed: Oct. 14, 2009

(65) Prior Publication Data

US 2010/0274944 A1 Oct. 28, 2010

(30) Foreign Application Priority Data

Apr. 28, 2009 (CN) .......................... 2009 1 0301920

(51) Int. Cl.
*H01Q 11/12* (2006.01)
*H04B 1/04* (2006.01)

(52) U.S. Cl.
USPC ................ 455/127.4; 455/403; 455/552.1; 370/479

(58) Field of Classification Search
USPC ................ 455/403, 127.4, 552.1; 370/479
See application file for complete search history.

(56) References Cited

U.S. PATENT DOCUMENTS
2008/0318621 A1* 12/2008 Fan et al. ................... 455/552.1

FOREIGN PATENT DOCUMENTS
CN 2842941 Y 11/2006

* cited by examiner

*Primary Examiner* — Gerald Gauthier
*Assistant Examiner* — Simon King
(74) *Attorney, Agent, or Firm* — Altis Law Group, Inc.

(57) ABSTRACT

A test apparatus for testing quality of serial interface communication between two CPUs of a dual-mode handset includes a processor module and a switch module. The processor module includes two serial ports, each serial port includes an output connector and an input connector, and the two input connectors respectively connected to the two CPUs. The output connector of either serial port connected to either CPU via the switch module. The processor module controls the CPU connected to the output connector to work when the switch module is switched on, and checks data transmission between the two CPUs via the two input connectors when the switch module is switched off.

9 Claims, 2 Drawing Sheets

SERIAL INTERFACE COMMUNICATION TEST APPARATUS AND TEST METHOD USING THE SAME

BACKGROUND

1. Technical Field

The present disclosure relates to serial interface communication test apparatuses and test methods, and particularly to a simplified serial interface communication test apparatus and a serial interface communication test method using the same.

2. Description of Related Art

A dual-mode handset generally includes two central processing units (CPUs) respectively processing communication signals of two different wireless communication apparatuses (e.g., GSM apparatus and CDMA apparatus). Each CPU generally includes at least one serial interface, and the two CPUs need to transmit data to each other through their serial interfaces when the dual-mode handset works. Thus, in manufacture of dual-mode handsets, quality of serial interface communication of the dual-mode handsets needs to be tested.

When testing the quality of serial interface communication of a dual-mode handset, the two CPUs of the dual-mode handset are electronically connected to each other through their serial interfaces, and a processor is used to control either of the two CPUs to work and check data transmission between the two CPUs. Particularly, the processor should have three serial ports, wherein one serial port is connected to an input connector of the serial interface of a CPU for controlling the CPU to work, and other two serial ports are respectively connected to output connectors of the serial interfaces of the two CPUs to check data transmission between the two CPUs. Thus, the controlling signals sent by the processor can be prevented from interfering with the data transmission between the two CPUs.

However, in most serial interface communication test apparatuses, the processor is a conventional personal computer (PC), which generally has only two serial ports. In a test process, one serial port of the PC is first connected to an input connector of the serial interface of a CPU, and the PC controls the CPU to work. When the controlled CPU works normally, the input connector of the serial interface of the CPU must be separated from the serial port, and the two serial ports of the PC are then respectively connected to the output connectors of the serial interfaces of the two CPUs to check data transmission between the two CPUs. Thus, the test process is complicated, and frequent connecting and separating operation may damage the serial ports after the PC is used to test many dual-mode handsets.

Therefore, there is room for improvement within the art.

BRIEF DESCRIPTION OF THE DRAWINGS

Many aspects of the present serial interface communication test apparatus and test method using the same can be better understood with reference to the following drawings. The components in the various drawings are not necessarily drawn to scale, the emphasis instead being placed upon clearly illustrating the principles of the present serial interface communication test apparatus and test method using the same. Moreover, in the drawings, like reference numerals designate corresponding parts throughout the figures.

DETAILED DESCRIPTION

Figure 1:
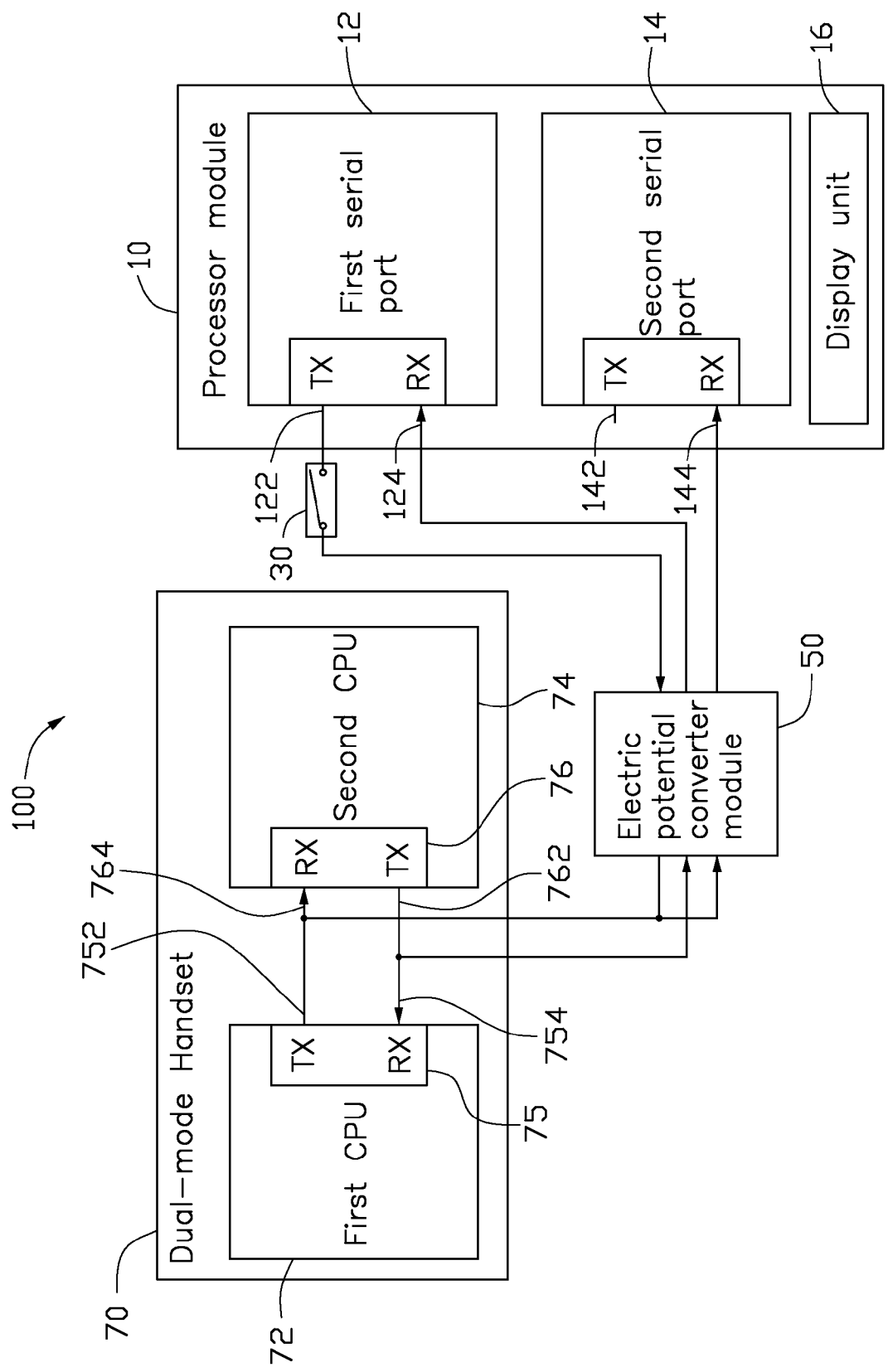
FIG. 1 is a block diagram of a serial interface communication test apparatus, according to an exemplary embodiment.

FIG. 1 schematically shows a serial interface communication test apparatus 100 according to an exemplary embodiment. The serial interface communication test apparatus 100 can be used to test quality of serial interface communication between two central processing units (CPU) of dual-mode handsets (e.g., a dual-mode mobile phone 70 shown in FIG. 1). The serial interface communication test apparatus 100 includes a processor module 10, a switch module 30, and an electric potential converter module 50.

The processor module 10 can be a personal computer (PC), microprocessor, single chip computer, etc. The processor module 10 includes a first serial port 12, a second serial port 14 and a display unit 16. Generally, a conventional PC has two serial ports, which can serve as the first serial port 12 and the second serial port 14. The first serial port 12 has an output connector ($T_x$) 122 and an input connector ($R_x$) 124, and the second serial port 14 has an output connector ($T_x$) 142 and an input connector ($R_x$) 144. The display unit 16 can be a conventional display connected to the first serial port 12 and the second port 14 to display data detected in the test process and test results.

The switch module 30 is connected to the output connector 122 of the first serial port 12 to select different working modes of the serial interface communication test apparatus 100 in a test process. The electric potential converter module 50 can be an electric potential converter chip. The switch module 30 is connected between the output connector 122 and the electric potential converter module 50, and the input connectors 124, 144 are both connected to the electric potential converter module 50. The electric potential converter module 50 is used to regulate the electric potential of communication signals transmitted between the processor module 10 and the dual-mode handset 70 into acceptable ranges.

The dual-mode handset 70 can be a conventional one, which has a first central processing unit (CPU) 72 and a second CPU 74. The first CPU 72 and the second CPU 74 are respectively used to process communication signals of two different wireless communication systems (e.g., a GSM system and a CDMA system). The first CPU 72 has a first serial interface 75, and the first serial interface 75 has an output connector ($T_x$) 752 and an input connector ($R_x$) 754. The second CPU 74 has a second serial interface 76, and the second serial interface 76 has an output connector ($T_x$) 762 and an input connector ($R_x$) 764. The input connector 752 is electronically connected to the output connector 764, and the output connector 754 is electronically connected to the input connector 762, thus the first CPU 72 and the second CPU 74 can transmit data to each other.

Figure 2:
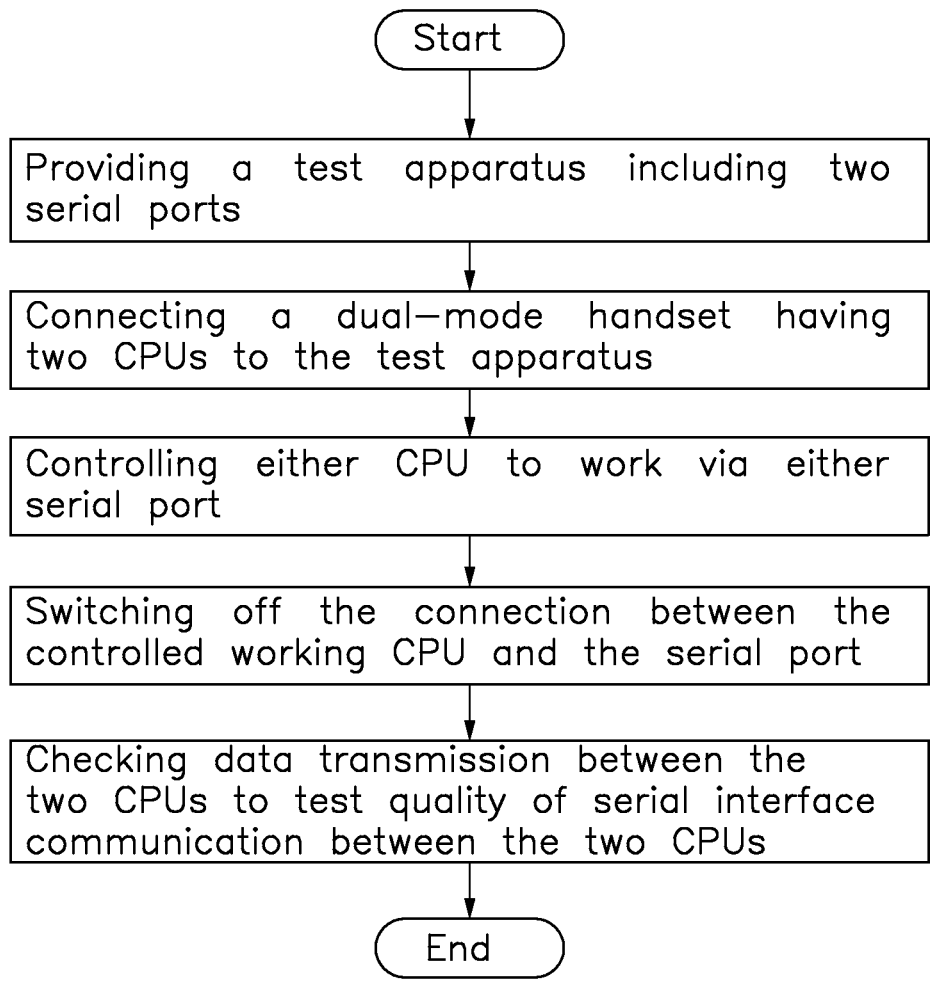
FIG. 2 is a flow chart of a serial interface communication test method, according to an exemplary embodiment.

Also referring to FIG. 2, a serial interface communication test method for testing serial interface communication quality of dual-mode handsets, according to an exemplary embodiment, is shown. The test method includes these steps as follows. First, an aforementioned serial interface communication test apparatus 100 is provided. Second, a dual-mode handset 70 requiring a serial interface communication test is connected to the test apparatus 100. Particularly, one end of the switch module 30 is electronically connected to the output connector 122 of the first serial port 12, and another end of the switch module 30 is electronically connected to the input connector 764 of the second CPU 74 via the electric potential converter module 50. The output connector 752 of the first CPU 72 is electronically connected to the input connector 144 of the second serial port 14 via the electric potential converter module 50. The output connector 762 of the second CPU 74 is electronically connected to the input connector 124 of the first serial port 12 via the electric potential converter module 50.

When the dual-mode handset 70 is connected to the test apparatus 100, the switch module 30 is switched on. The processor module 10 sends controlling signals to the second CPU 74 via the first serial port 12, the switch module 30, the electric potential converter module 50 and the serial interface 76 to control the second CPU 74 to tentatively work. Thus, the second CPU 74 and the first CPU 72 transmit communication signals to each other. Second, when the second CPU 74 works normally, the switch module 30 is switched off to prevent the controlling signals from interfering with the data transmission between the first CPU 72 and the second CPU 74. After the switch module 30 is switched off, the first CPU 72 and the second CPU 74 keep transmitting communication signals to each other via the serial interfaces 74, 76, and the communication signals are also transmitted from the output connectors 752, 762 to the input connectors 144, 124, correspondingly. Thus, the processor module 10 checks data transmission between the first CPU 72 and the second CPU 74 via the first serial port 12 and the second serial port 14 to test serial interface communication quality of the dual-mode handset 70. The data detected by the processor module 10 and the test result can be displayed on the display unit 16.

In the present test method, the processor module 10 can also controls the first CPU 72 to tentatively work, and then checks data transmission between the first CPU 72 and the second CPU 74 to test serial interface communication quality of the dual-mode handset 70. The output connector 142 of the second serial port 14 can also be connected to the dual-mode handset 70 via the switch module 30 and the electric potential converter module 50 to control either of the first CPU 72 and the second CPU 74 to work.

The present serial interface communication test apparatus 100 uses only two serial ports. Compared with most conventional test apparatuses requiring three serial ports, the test apparatus 100 is simplified and more compatible with most conventional PCs. Additionally, the test apparatus 100 can be used more conveniently, since the connecting method between the test apparatus 100 and the tested dual-mode handset 70 needs not be changed in the test process.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A test apparatus for testing quality of serial interface communication between two central processing units (CPU) of a dual-mode handset, comprising:
a processor module including two serial ports, each serial port including an output connector and an input connector, and the two input connectors respectively connected to the two CPUs; and
a switch module, the output connector of either serial port connected to either CPU via the switch module; wherein the processor module controls the CPU, which is connected to the output connector, to work when the switch module is switched on, and checks data transmission between the two CPUs via the two input connectors to test quality of serial interface communication between the two CPUs when the switch module is switched off.

2. The test apparatus as claimed in claim 1, further comprising an electric potential converter module, the switch module connected to either CPU via the electric potential converter module, and the input connectors respectively connected to the two CPUs via the electric potential converter module.

3. The test apparatus as claimed in claim 1, wherein the processor module further includes a display unit connected to the two serial ports to display detected data and test results.

4. The test apparatus as claimed in claim 1, wherein the processor module is a personal computer.

5. A method for testing quality of serial interface communication between two CPUs of a dual-mode handset, comprising these steps:
providing a serial interface communication test apparatus including two serial ports, each serial port including an input connector and an output connector;
connecting the two CPUs to the test apparatus;
controlling either CPU to work via the output connector of either serial port;
turning off the connection between the output connector and the controlled working CPU; and
checking data transmission between the two CPUs via the two input connectors to test quality of serial interface communication between the two CPUs.

6. The method as claimed in claim 5, further comprising a step of connecting a switch module between the output connector and the controlled CPU.

7. The method as claimed in claim 6, further comprising a step of connecting an electric potential converter module between the switch module and the controlled CPU.

8. The method as claimed in claim 5, further comprising a step of connecting an electric potential converter module between the two input connectors and the two CPUs.

9. The method as claimed in claim 5, further comprising a step of displaying the detected data d and the test results.

* * * * *